April 16, 1957  J. L. COCKRELL, JR  2,788,935
MINERAL SPECIMEN ENVELOPE

Filed Oct. 14, 1955  2 Sheets-Sheet 1

INVENTOR.
James L. Cockrell, Jr.
BY
ATTORNEY.

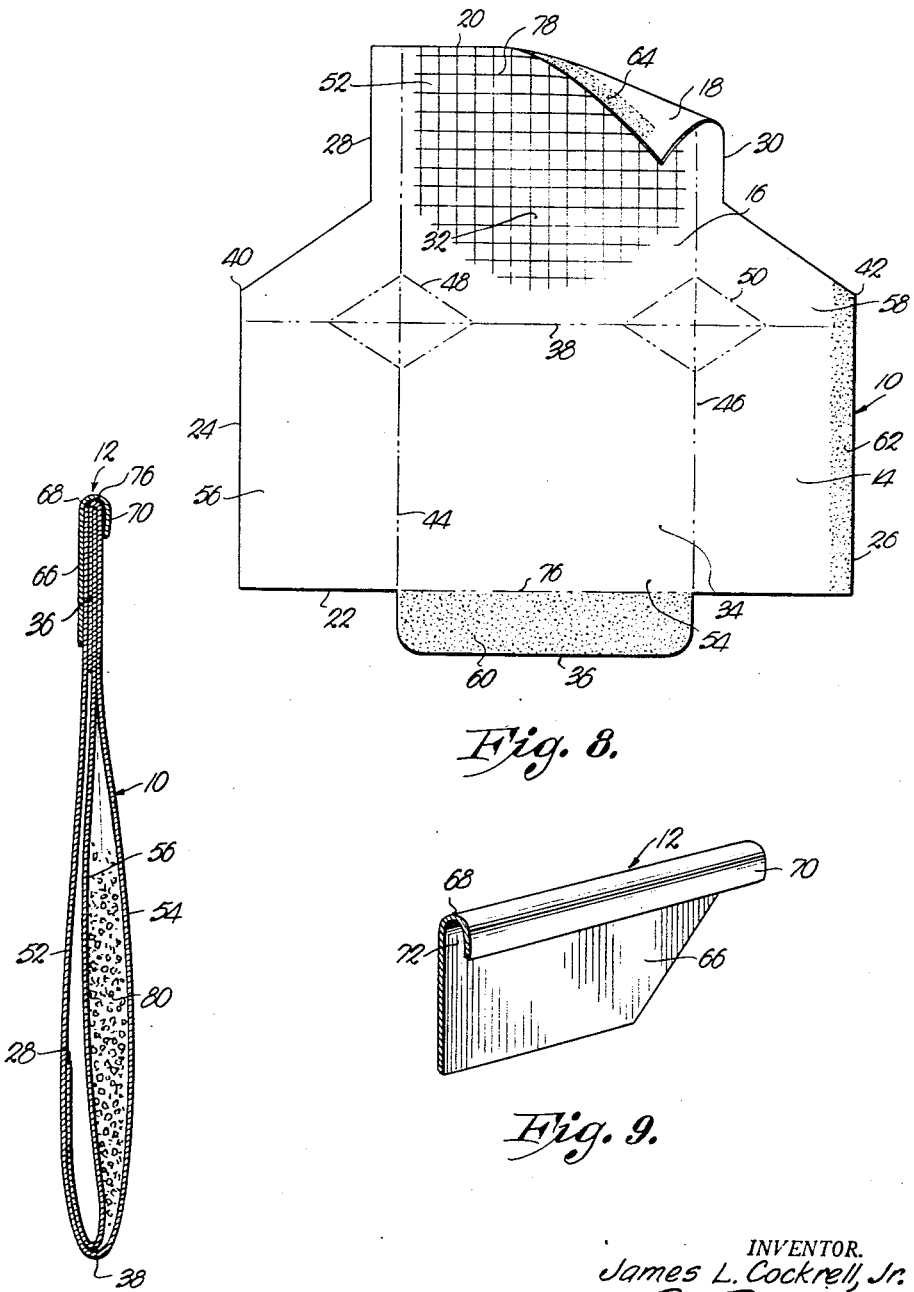

United States Patent Office 2,788,935
Patented Apr. 16, 1957

2,788,935
MINERAL SPECIMEN ENVELOPE

James L. Cockrell, Jr., Tulsa, Okla., assignor to Ross-Martin Company, Tulsa, Okla., a corporation of Oklahoma Application October 14, 1955, Serial No. 540,538

2 Claims. (Cl. 229—62)

This invention relates generally to the field of paper container construction and, more particularly, to an improved type of envelope adapted for use in receiving, carrying, and examining mineral specimens.

Especially in the geological, petroleum and related fields, analysis of subsurface earth formations are made by drilling from which finely granulated specimens of mineral material taken from various depths below the surface of the earth are examined and evaluated. Since such specimens must be taken in the field, which is oftentimes a considerable distance from the laboratory, and then identified and transported to the laboratory where they are finally examined and analyzed, a considerable problem has existed with respect to suitable container means for receiving and preserving the specimens between their time of removal from the earth and their final analysis in the laboratory. Since the analysis of such specimens generally involves the examination of relatively large numbers of such samples under a microscope and by other means which require exposure of the fragments, it has been found desirable for the specimens to be examined in the laboratory without shifting or complete removal from the container in which they are placed in the field. It has also been found of assistance in connection with the laboratory examination of the specimens for the container or supporting means upon which they are examined to be provided with coordinate markings to facilitate the orientation of instruments used in examination of the samples.

Heretofore, no specimen container or carrying means has been available, let alone at reasonable cost, which would be adapted for accomplishing the above-mentioned functions.

Accordingly, it is the primary object of this invention to provide an improved mineral specimen envelope having all of the above-mentioned and other advantages.

It is another important object of the invention to provide such an envelope having means for the quick and positive, releasable sealing of same after a specimen has been introduced therein.

It is another important object of this invention to provide such an envelope having coordinate square markings on an exposed portion thereof to which a specimen may be shifted for examination without complete removal from the envelope.

It is another important object of this invention to provide such an envelope which may be quickly and inexpensively manufactured from a minimum number of structural components.

Still other important objects of this invention, including certain important details of construction, will be made clear or become apparent as the following description of the invention progresses.

In the accompanying drawing:

Fig. 7 is a cross sectional view taken on line VII—VII of Fig. 5;

Fig. 8 is an elevational view of the blank from which the bag portion of the envelope may be formed, one corner thereof being illustrated as rolled over to show a strip of adhesive provided on the opposite face; and Fig. 9 is an enlarged, fragmentary perspective view of the metallic member used for holding the bag portion of the envelope in its closed or sealed condition.

Figure 1:
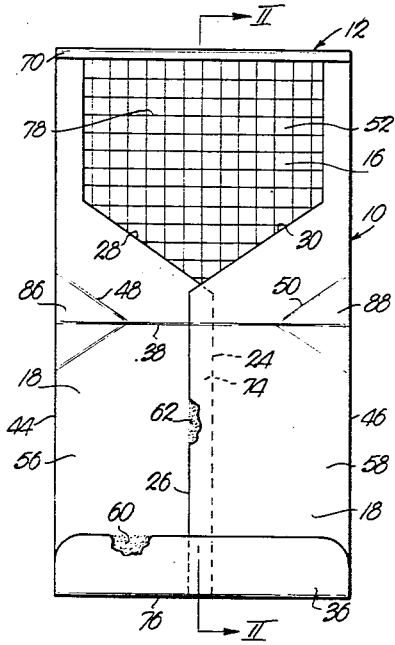
Fig. 1 is a front elevational view of an improved envelope made in accordance with this invention.

Referring now to the drawings the numeral 10 generally designates the bag portion of the envelope, which is preferably formed of relatively strong and heavy paper, while the numeral 12 generally designates a metallic member utilized to permit releasable sealing of the bag 10 after a specimen has been introduced thereinto and which will be hereinafter more fully described.

With particular reference first to Fig. 8, wherein is shown a generally rectangular blank 14 from which the paper bag 10 is formed, it will be seen that blank 14 has a pair of opposed faces 16 and 18, a top edge 20, a bottom edge 22, and a pair of opposed side edges 24 and 26. Side edges 24 and 26 are trapezoidally cut away adjacent top edge 20 as at 28 and 30 respectively to present an upper portion 32 and a lower portion 34 on the blank 14. A generally rectangular flap portion 36 extends from lower portion 34 and bottom edge 22 intermediate the ends of the latter.

Blank 14 is provided, preferably by scoring or the like on face 16 thereof, with a horizontal line of bend 38 extending from side edge 24 to side edge 26 between upper portion 32 and lower portion 34 thereof. It is significant that the line of bend 38 is spaced somewhat below the lowermost extremities 40 and 42 of the cut away portions 28 and 30.

Blank 14 is similarly provided with a pair of spaced, vertical lines of bend 44 and 46 extending from the upper edge 20 of blank 14 to the lower edge 22 thereof, lines of bend 44 and 46 intersecting the lower edge 22 at the zone of juncture between the opposite ends of flap portion 36 and lower edge 22 and being spaced inwardly from the cut away portions 28 and 30 respectively.

A pair of diagonal shaped lines of bend 48 and 50 are similarly provided on blank 14 adjacent the intersections of line of bend 38 with lines of bend 44 and 46 respectively.

The central part of blank 14 between lines of bend 44 and 46 is divided by line of bend 38 into an upper rear portion 52 and a lower rear portion 54 of bag 10, which are rectangular and of equal dimensions. A left front portion 56 of bag 10 is presented between line of bend 44 and side edge 24 and cut away portion 28 of blank 14. Similarly, a right front portion 58 of bag 10 is presented on blank 14 between line of bend 48 and side edge 26 and cut away portion 30.

Strips of adhesive material designated 60, 62 and 64 are respectively provided on face 16 of flap portion 36, on face 16 of right front portion 58 along side edge 26 thereof and on face 18 of upper rear portion 52 along top edge 20 thereof.

Referring next particularly to Fig. 9, wherein the preferably metallic member 12 is shown, it will be seen that such member 12 is elongated and J-shaped in cross section having a relatively long leg portion 66, a bight portion 68 and a relatively short bent back leg portion 70 presenting a channel 72 between and at the overlap of leg portion 70 upon leg portion 66.

Figure 2:
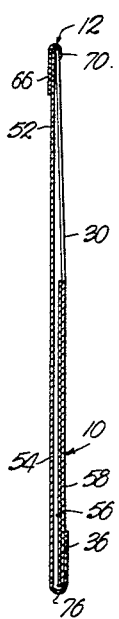
Fig. 2 is a cross sectional view taken on line II—II of Fig. 1.
Figure 3:
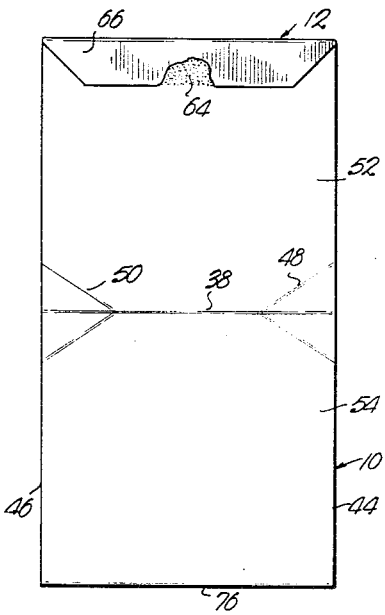
Fig. 3 is a rear elevational view of the envelope of Fig. 1.

Referring next particularly to Figs. 1, 2 and 3, wherein the envelope including the bag 10 formed from blank 14 and the member 12 are assembled in a completed envelope, it will be seen that the initially flat blank 14 has been folded along line of bend 44 to move the left front portion 56 into overlapping relationship with the upper rear portion 52 and lower rear portion 54, while the right front portion 58 has been similarly folded along line of bend 46 into overlapped relation with rear portions 52 and 54 and a narrow strip 74 of left front portion 56 along the side edge 24. The right front portion 58 has then been secured to the left front portion 56 by means of the adhesive 62.

The flap portion 36 has then been folded along a line of bend 76 in alignment with and constituting a continuation of the lower edge 22 of blank 14 into overlapping relationship with the left front portion 56 and the right front portion 58. Flap portion 36 is secured to left front portion 56 and right front portion 58 by the adhesive material 60.

The longer leg portion 66 of member 12 is secured to the face 18 of upper rear portion 52 by means of the adhesive 64, it being noted that the shorter leg portion 70 of member 12 overlaps the edge 20 of upper rear portion 52 as well as the uppermost extremities of left front portion 56 and right front portion 58 so that the channel 72 is adapted to releasably receive the lowermost portion of the bag 10 adjacent the line of bend 76. In this connection, it is noted that the adhesive material 62 extends only along the face 18 of upper rear portion 52, but not along the face 18 of the uppermost extremities of the left front portion 56 and the right front portion 58.

The face 16 of upper rear portion 52 is preferably imprinted with square, grid or coordinate markings 78 of predetermined dimensions before the bag 10 is assembled. As will be apparent in Fig. 1, such markings 78 are exposed to view on the face 16 of upper rear portion 52 between the cut away portions 28 and 30 of left front portion 56 and right front portion 58 respectively.

Figure 4:
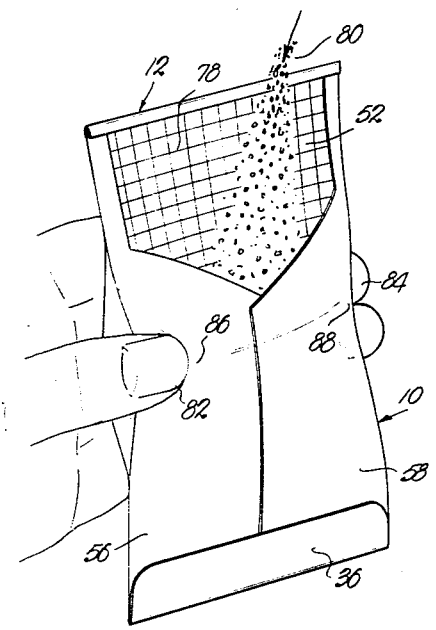
Fig. 4 is a front perspective view of one of the improved envelopes being held by an operator in condition for receiving a specimen.
Figure 5:
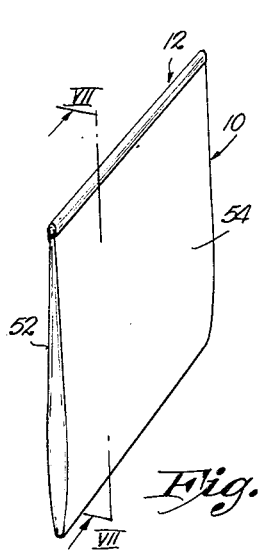
Fig. 5 is a perspective view of the envelope showing the same in releasable, sealed condition and ready for transportation or preservation of a specimen therein.
Figure 6:
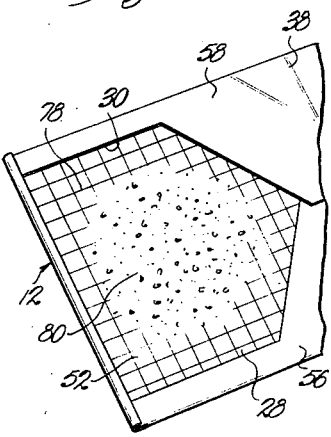
Fig. 6 is a fragmnetary perspective view of the envelope showing a portion of a specimen shifted to a position for examination without removal from the envelope.

Referring now more particularly to Figs. 4, 5 and 6, Fig. 4 shows the bag 10 in condition for receiving a quantity of mineral specimen particles 80, pressure being applied by an operator's fingers as at 82 and 84 upon the opposed portions 86 and 88 of bag 10 defined by lines of bend 48 and 50. Such lines of bend 48 and 50 facilitate the opening of the bag 10 to maintain the front portions 56 and 58 spaced from the rear portions 52 and 54 during introduction of a specimen 80.

After the specimen 80 has been introduced into the bag 10 and fallen by gravity to the lower part of bag 10 between lower rear portion 54 and left and right front portions 56 and 58 thereof, the pressure at 82 and 84 is released permitting the bag to close along the line of bend 38 between the stored specimen 80 and the opening in bag 10 defined by cut away portions 28 and 30. The bag 10 may then be folded along the line of bend 38 and the edge presented by line of bend 76 tucked into the channel 72 of member 12 between the upper rear portion 52 of bag 10 and the short leg 70 of member 12, as illustrated in Fig. 5. It will be understood that the spacing between the legs 70 and 66 of the member 12 is such that the channel 72 will releasably but relatively snugly receive the normally lowermost portion of bag 10 adjacent the line of bend 76 thereof so as to hold the bag 10 in the folded condition described until intentionally unfolded by the handling personnel.

After the specimen 80 has been transported to the laboratory within the bag 10 in the folded and sealed condition just described, it may be opened for examination of the specimen 80 by the laboratory personnel by releasing the portion of bag 10 adjacent line of bend 76 from the channel 72 and unbending the bag 10 along the line of bend 38. Pressure may then again be applied as at 82 and 84 upon opposed bag portions 86 and 88 to open the intermediate closure of bag 10 which effectively results from the presence of the line of bend 38. With such pressure applied and the bag 10 thus opened to permit passage of specimen particles 80 across the line of bend 38 between rear portions 52 and 54, the bag 10 may be tilted to dispose the end thereof carrying member 12 slightly downwardly and the bag 10 may be slightly shaken to shift the desired amount of the specimen 80 onto that part of upper rear back portion 52 exposed within the opening defined by cut away portions 28 and 30. When the desired amount of the specimen 80 is so disposed, same may then be examined and analyzed under a microscope or with other appropriate instruments, making use of the grid coordinate markings 78 underlying the specimen 80 in connection with the analysis.

After the examination of the specimen 80 has been completed, the bag 10 may again be returned to its normal, unbended, upright condition with pressure being applied as at 82 and 84 so that all of the specimen 80 may return to that part of the bag 10 below the line of bend 38. Thereupon, the bag 10 may again be bent along the line of bend 38 and the normally lowermost part thereof adjacent line of bend 76 placed within channel 72 of member 12, thus adapting the bag 10 for filing and permanent storage of the specimen 80. Oviously, suitable identifying markings can be placed upon the exterior of the bag 10 at the time that the specimen 80 is initially taken in the field.

It will now be evident that the structure described is ideally suited for accomplishing all of the above-mentioned and other objectives of the invention. As is usually the case, where considerable numbers of specimens must be taken, and perhaps accumulated, the simplicity, inexpensiveness and minimum space requirements of the structure provided by this invention are particularly advantageous.

As will be apparent to those skilled in the art, certain minor modifications and changes could be made without departing from the true spirit and intention of the invention. Accordingly, it is to be understood that the invention shall be deemed limited only by the scope of the appended claims.

Having thus described the invention, what is claimed as new and desired to be secured by Letters Patent is:

1. A foldable, envelope-like container for finely granulated mineral specimens or the like, said container comprising a generally rectangular, paper bag having a normally flat front portion and a normally flat rear portion, said front and rear portions being interconnected along the normally lowermost end and both sides of the bag to close the latter therealong, said front portion having a part thereof adjacent the normally uppermost end of the bag cut away to present an opening exposing a normally upper part of said rear portion, said front and rear portions each being provided with a lateral line of bend substantially equidistant from its ends adapting the bag to be folded upon itself along said lines of bend; a channeled, substantially rigid member having one leg portion secured to said rear portion of the bag adjacent said uppermost end of the latter, a bight portion extending in a normally forward direction from said one leg portion and another leg portion extending in a normally downward direction from said bight portion in spaced relation to said one leg portion presenting a channel for releasably receiving and holding the normally lowermost end of the bag when the latter is folded along said lines of bend; and scoring means in said front and rear portions of the bag providing each with a pair of opposed, substantially triangular, pre-formed lines of bend straddling said lateral lines of bend at the opposite sides of the bag, presenting pre-defined, pressure responsive zones on the bag for use in separating said front and rear portions along said lateral lines of bend to open the bag and maintain the same in open condition.

2. As an article of manufacture, a blank for use in forming a foldable, envelope-like container for finely granulated mineral specimens or like, said blank comprising an initially flat, generally rectangular sheet of paper having a generally rectangular flap portion extending from one end thereof in spaced relationship to the sides thereof, there being opposed generally trapezoidal portions cut away from the sides of said sheet adjacent the other end thereof; scoring presenting a pair of parallel, weakened lines of bend on the sheet extending from said one end thereof adjacent each extremity of said flap portion respectively to said other end of the sheet, said lines of bend being spaced inwardly from said cut away portions; scoring presenting a weakened, lateral line of bend on the sheet extending from one side thereof to the opposite side thereof substantially equidistant between the ends of the sheet, said lateral line of bend being between said cut away portions and said one end of the sheet and scoring presenting a pre-formed, weakened, substantially diamond-shaped line of bend at the intersection of said lateral line of bend with each of said parallel lines of bend respectively.

References Cited in the file of this patent

UNITED STATES PATENTS

| | | |
|---|---|---|
| 828,989 | Ward | Aug. 21, 1906 |
| 905,542 | King | Dec. 1, 1908 |
| 1,222,565 | Sherman | Apr. 10, 1917 |
| 1,378,310 | Baird | May 17, 1921 |
| 1,647,865 | Hausser | Nov. 1, 1927 |
| 1,918,351 | Schultze | July 18, 1933 |
| 2,030,634 | Holloway | Feb. 11, 1936 |
| 2,724,543 | Bauer | Nov. 22, 1955 |

FOREIGN PATENTS

| | | |
|---|---|---|
| 179,441 | Germany | Dec. 1, 1906 |